Dec. 1, 1925.  
R. C. FREDERICKSON  
1,563,701  
CONDENSATION PREVENTING DEVICE  
Filed March 6, 1925
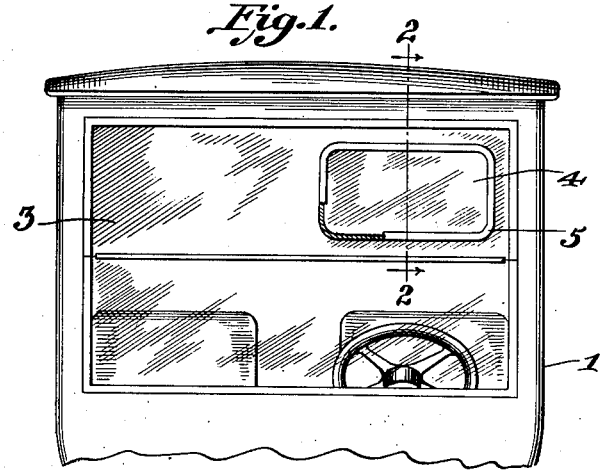
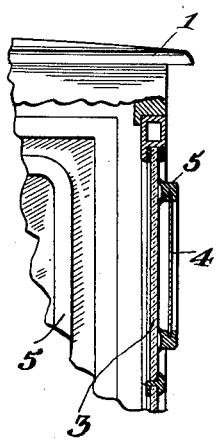
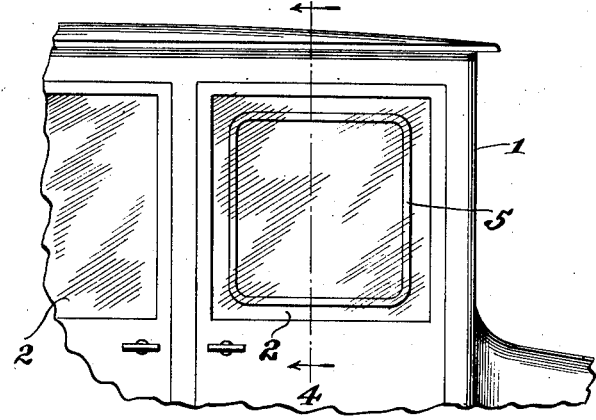
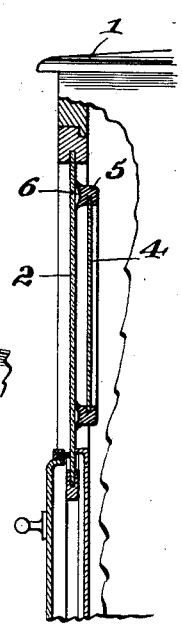
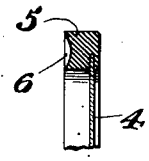
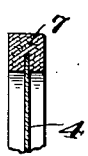
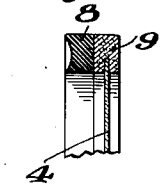
Inventor  
R. C. Frederickson  
By Eccleston & Eccleston  
Attorneys Patented Dec. 1, 1925.

1,563,701

UNITED STATES PATENT OFFICE.

RALPH C. FREDERICKSON, OF KENSAL, NORTH DAKOTA.

CONDENSATION-PREVENTING DEVICE.

Application filed March 6, 1925. Serial No. 13,478.

*To all whom it may concern:*

Be it known that I, RALPH C. FREDERICKSON, a citizen of the United States, residing at Kensal, in the county of Stutsman and State of North Dakota, have invented certain new and useful Improvements in Condensation-Preventing Devices, of which the following is a full, clear, and exact description.

This invention relates to a simple and inexpensive means for preventing the collection of moisture on window panes and is intended especially for use in connection with closed automobiles such as sedans and the like.

It is well understood that the transparency of the windows of closed automobiles, particularly those provided with heating apparatus, is often destroyed in cold weather by the deposit of a layer of frost on the inner surface of the pane. This is caused, of course, by the heated and moisture-laden air adjacent the windows becoming chilled and depositing the condensed moisture on the pane which is immediately converted into frost.

It is an object of the present invention to eliminate the above-enumerated disadvantages by providing a sheet of celluloid or similar transparent material which is applied to the interior or exterior of the window pane so as to prevent the moist air from reaching the window pane in the first instance, and to prevent the cold air from reaching the window pane in the second instance.

It is also an object of the invention to so attach the sheet of celluloid or the like as to provide a partial vacuum between the same and the adjacent window pane.

Other objects and advantages of the invention will be apparent from the following description when taken in connection with the accompanying drawings, in which;

Figure 1 is a fragmentary front elevation of an automobile showing my novel device in position on the exterior of the windshield.

Figure 2 is a vertical section taken on line 2—2 of Figure 1.

Figure 3 is a fragmentary side elevation of an automobile showing the condensation-preventing device attached to the inside of a window pane.

Figure 4 is a vertical section taken on line 4—4 of Figure 3.

Figure 5 is a fragmentary section through the device per se, and

Figures 6 and 7 are views similar to Figure 5 but showing slightly modified forms.

Referring to the drawings more in detail, the numeral 1 indicates a closed automobile such as a sedan, coupé, limousine or the like provided with side windows 2 and windshield 3.

It is quite common in automobiles of this type to provide a heater operated by exhaust gases or other independent means for maintaining a comfortable temperature on the interior of the car during the winter months, and as herein before stated, moisture is caused to be deposited on the inner surface of the window panes, and windshield and in very cold weather this moisture is converted into frost which renders the window panes as well as the windshield merely translucent and cuts off the view of the operator of the automobile as well as of the occupants.

By means of the present invention which may be attached either to the outer surface of the window panes or windshield or to the inner surface thereof, this objectionable deposit of frost on the window panes is prevented. Obviously, if the moist atmosphere of the interior of the automobile is prevented from reaching the window pane and cannot become chilled no moisture will be deposited on the window pane. Furthermore, if the cold air on the exterior of the automobile is prevented from reaching the outer surface of the window pane the latter will not become chilled and will therefore not cause moisture contained in the heated atmosphere in the interior of the automoible to be deposited on the inner surface of the window pane.

The present invention therefore comprises a sheet of transparent material such as celluloid or the like which is indicated by the numeral 4 and which may be applied to the outer surface of the window panes as indicated in Figures 1 and 2, or upon the inner surface thereof as indicated in Figures 3 and 4. By applying the sheet of transparent material 4 to the outer surface of the window pane, cold air is prevented from chilling the window pane and therefore prevents moisture from being deposited on that part of the window pane covered by the sheet of celluloid. Likewise, if the sheet of celluloid 4 is applied on the inner surface of the window pane as shown in Figures 3 and 4 then heated and moisture-laden air of the interior of the automobile is prevented from reaching the cold glass of the window pane and therefore cannot be sufficiently chilled to cause a deposit of moisture thereon.

The sheet of transparent material as shown in Figures 1 to 5 inclusive has its edges embedded in a strip of rubber 5 although many other flexible and compressible materials might be substituted therefor. The rubber strip 5 is so applied to the edges of the sheet 4 as to provide an annular projection which extends a substantial distance beyond the plane of the sheet and this projecting portion or rim is provided with a concavity or depression 6, as clearly shown in Figures 2, 4 and 5, and which converts the rubber strip into what may be termed a vacuum cup. In applying the device to the window pane it is obvious that it is only necessary to press the vacuum cup 5 tightly against the window pane so as to flatten out the concavity 6, thereby ejecting the air from the space inclosed by the wall of this concavity and the portion of the window pane covered thereby. When the pressure is removed from the strip 5 the device will adhere to the window pane in a manner well understood. It may be here pointed out, however, that a partial vacuum and dead air space is also provided between the transparent sheet 4 and the window pane by this method of applying the condensation-preventing device, for the reason that when the vacuum cup 5 is collapsed the sheet 4 approaches very close to the window pane 3 and when pressure is released this sheet is caused to move away a slight distance from the window pane due to the compressible material forming the vacuum cup returning to a shape approximating its original condition. And, since both vacuums and dead air spaces are poor conductors of heat it will be apparent that when the device is applied to the exterior of the window pane as shown in Figures 1 and 2, the cold air will be prevented from reaching that portion of the window pane covered by the sheet 4, and when the device is applied to the interior of the window pane as shown in Figures 3 and 4 the heated air is prevented from coming in contact with that portion of the window pane covered by the sheet of transparent material. Furthermore, the celluloid sheet 4 will be protected against being chilled by the partial vacuum which has been set up in the space between the window pane and the sheet.

In the form of the invention shown in Figure 6 the edges of the celluloid sheet are embedded in a felt strip 7 and this strip may be applied to the windshield or the like by means of some adhesive material such as glue; while in Figure 7 is shown a vacuum cup comprising a rubber strip 8 similar to that disclosed in Figures 1 to 5 inclusive and which is directly united to a felt strip 9 in which the edges of the celluloid sheet 4 are embedded. In this latter form of the invention, of course, the device is attached to the windshield in a manner identical with that previously described and shown in Figues 1 to 5 of the drawings.

From the foregoing description taken in connection with the accompanying drawings it will be apparent that I have devised a very simple and inexpensive construction of condensation preventing device which may be applied to a windshield or the like without the use of tools or skilled labor, and which will successfully prevent the collection of frost upon the window panes to which it is attached.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claim.

What I claim as new and desire to secure by Letters Patent is:

In a device of the class described an annular vacuum cup composed of a continuous strip of rubber and a continuous strip of fabric directly united, a transparent sheet of celluloid positioned within said annular vacuum cup and having its edges attached to said fabric strip.

RALPH C. FREDERICKSON.